United States Patent [19]

Dong et al.

[11] Patent Number: 4,828,375
[45] Date of Patent: May 9, 1989

[54] LENS FOR SCANNING DEVICES

[75] Inventors: Yueh-Joy Dong; Chin-Hen Fang, both of Hsin Chu Hsien, China

[73] Assignee: Industrial Technology Research Institute, Hsinchu Hsien, Taiwan

[21] Appl. No.: 128,217

[22] Filed: Dec. 3, 1987

[51] Int. Cl.$^4$ .......................... G02B 9/14; G02B 26/10
[52] U.S. Cl. ...................................... 350/475; 350/6.8
[58] Field of Search .................................. 350/475, 6.8

[56] References Cited

U.S. PATENT DOCUMENTS 4,531,815  7/1985  Konno et al. ........................ 350/475

Primary Examiner—John K. Corbin
Assistant Examiner—Rebecca D. Gass
Attorney, Agent, or Firm—Cushman, Darby & Cushman

[57] ABSTRACT

It is a lens comprising three elements for a scanning device; the lens is particularly for providing a linear scanning. A beam enters the lens from its front focus by rotating a constant angular velocity, will become a beam in parallel with the axis of the lens and moving at a contant speed when passing through the lens; the distance H between the beam and the axis of the lens, the contained angle $\theta$ between the incident beam and the axis of the lens have the relation of $H = KF\theta$, in which F is the focal length of the lens, and K is a constant.

2 Claims, 2 Drawing Sheets

LENS FOR SCANNING DEVICES

BACKGROUND OF THE INVENTION

In designing a conventional lens, it is usually required to satisfy the "Abbe sine condition" so as not to have any aberration in the vicinity of the axis of lenses in order to have the rays projecting-in the lens at a contained angle $\theta$ from the front focus formed into a beam after passing through the lens being parallel with the axis of lens; the height H of the rays (relative to the axis of the lens) is equal to the equivalent focal length F multiplying the tangent function of the incident angle $\theta$ of the rays, i.e., $H = F \cdot \tan \theta$. When using a conventional lens in a scanning device, the incident beam moves at a constant angular velocity will generate a transmitted beam to scan at a speed varied in a manner of trigonometric function curve, i.e., the transmitted beam is unable to move at a constant speed.

In order to obtain a linearly scanning, the lens has to be designed specially. U.S. Pat. No. 3,973,833 discloses a two-element lens for obtaining such feature; the first element of that lens is a bi-convex element, while the second element is a concave-convex one; each of them has its specific curvature. The curvature tolerance and the distance between elements are controlled accurately so as to introduce certain coma for satisfying the relationship $H = F\theta$.

According to the same basic function, the lens of the present invention comprises three elements so as to obtain higher linearity. Under the same and maximum linearity tolerance condition, the present invention would provide more tolerance during manufacture and assembling.

SUMMARY OF THE INVENTION

The present invention provide a lens including three elements to be used in an optical scanning device. The ray is projected, moving at an constant angular velocity, into the lens, then the transmitted rays become a parallel beam relative to the axis of the lens be and moves at a constant speed suitable for a scanning device, such as a distance-measuring device. In such device, a polygon rotates at a constant angular velocity so as to have the incident beam from a fixed direction reflects into different directions. Upon a mirror plane rotating out of the incident beam, the next plane turns in; therefore, the reflected beam rotates at a constant angular velocity within a certain angle. The reflected beam on the mid-portion of aforesaid angle is projected on the lens; the starting point of the beam, i.e. the average operation position of the mirror plane, is exactly falling on the front focus of the lens. After the beam passing through the lens, the transmitted beam becomes parallel with the axis of the lens.

The prime object of the present invention is to provide a lens comprising three elements; the height of the transmitted beam is proportional to the angle between the incident beam and the axis of the lens.

Another object of the present invention is to provide the lens with a higher linearity than the conventional lens, i.e. to obtain more manufacturing tolerance under the same precision requirement.

The lens according to the present invention has three elements, of which the first is a bi-convex one; the second is a concave-convex one; the third is a bi-convex one. The radius of curvature on the object side of the first element is equal to approximately two times of the equivalent focal length of the lens, while the radius of curvature on the image side of the element is equal to a half that focal length. There is a suitable space between the second element and the first element. The radius of curvature on the object side of the second element is approximately the same as that on the image side of the first element the radius of curvature on the image side of the second element is approximately equal to the focal length. The third element is closely mounted with the second element; the radius of curvature on its object side is approximately equal to 4.5 times of the focal length, while the radius of curvature on its image side is approximately equal to 3.5 times of the focal length.

DETAILED DESCRIPTION

Figure 1:
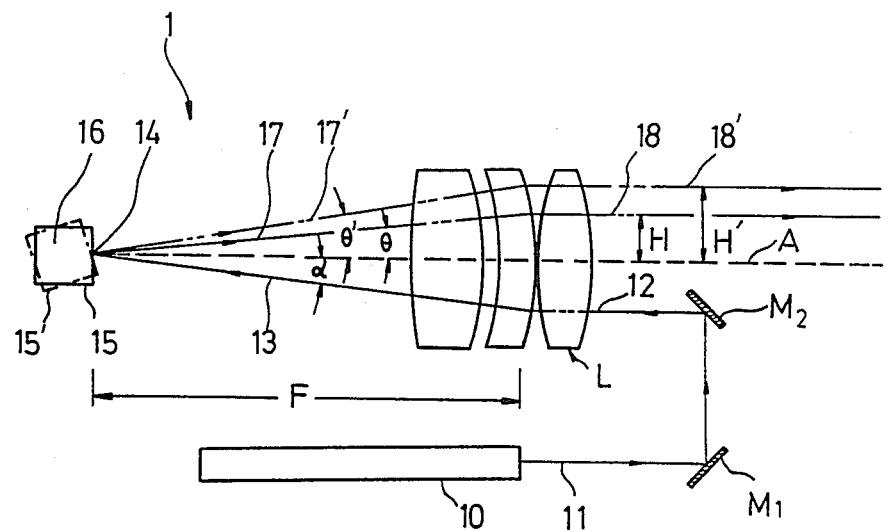
FIG. 1 illustrates a schematic diagram of a scanning device according to the present invention.

Referring to FIG. 1, there is a scanning device 1 with the lens L of the present invention, which comprises a light source 10 to provide a light beam 12 passing through the lens L to form into a beam 13 with an angled with the lens-axis A to arrive at the front focus 14 of the lens and being reflected by a multi-plane mirror 15, of which the shaft 16 is pivotally placed behind the focus 14 and driven to rotate by means of a motor (not shown) at a constant rotation speed so as to let each plane of the mirror pass through the focus area in a constant angular velocity. Therefore, the reflected beams 17, 17' from the turning mirror 15, 15' moves at a constant angular velocity within an angle relative to the axis of the lens L. The transmitted beams 18 and 18' passing through the lens L are parallel to the axis A constantly; the heights H and H' thereof are in proportion to the products of the incident angles $\theta$ and $\theta'$ (the contained angles between the reflected beams and the axis A) to multiply the equivalent focal length F of the lens, i.e., $H = KF\theta$, and $H' = HF\theta'$, in which K is a constant. Upon the reflected beams 17 and 17' being projected into the lens L at an constant angular velocity, the transmitted parallel beams 18 and 18' from the lens L are moving at a constant speed; therefore; they are suitable for scanning detection.

Figure 2:
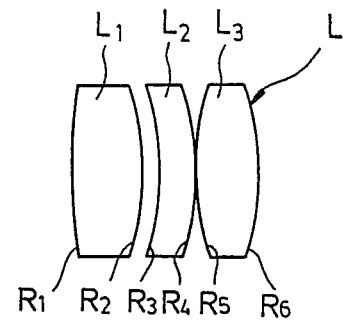
FIG. 2 is an embodiment of the present invention.

FIG. 2 illustrates the structure of the lens L according to the present invention, which comprises a first element $L_1$, a second element $L_2$ and a third element $L_3$, and their radii of curvature are $R_1$, $R_2$, $R_3$, $R_4$, $R_5$, and $R_6$ respectively. The clear aperture of the embodiment of the present invention is 48 mm; the equivalent focal length of the embodiment is 259.1 mm. The elements $L_1$, $L_2$ and $L_3$ are made of materials of SF12, SF14 and BKF respectively; the radii of curvature R, the axial distance D between each two surfaces, the refractive indexes of the elements, and the Abbe Number Vd of the lenses are listed in table 1 as follows:

TABLE 1

| | | R (mm) | D (mm) | Nd | Vd |
|---|---|---|---|---|---|
| $L_1$ | $R_1$ | 530.18 | | | |
| | | | 15.4 | 1.644 | 33.84 |
| | $R_2$ | −133.89 | 5.32 | | |
| | $R_3$ | −124.382 | 5.32 | | |
| $L_2$ | | | 7 | 1.756 | 26.53 |

TABLE 1-continued

| | | R (mm) | D (mm) | Nd | Vd |
|---|---|---|---|---|---|
| | R4 | −262.226 | 0 | | |
| | R5 | 1150.25 | 0 | | |
| L3 | | | 15 | 1.515 | 64.17 |
| | R6 | −935.50 | | | |

The aforesaid embodiment is designed in accordance with a light beam that is within the visible wavelength range; it is particularly useful for helium-neon laser at a wavelength of 0.6328 μm. When the data of the radii of curvature, the distances between surfaces, the equivalent focal length and the clear aperture are enlarged or reduced in a proportion, the function of the lens would not be affected.

Figure 3:
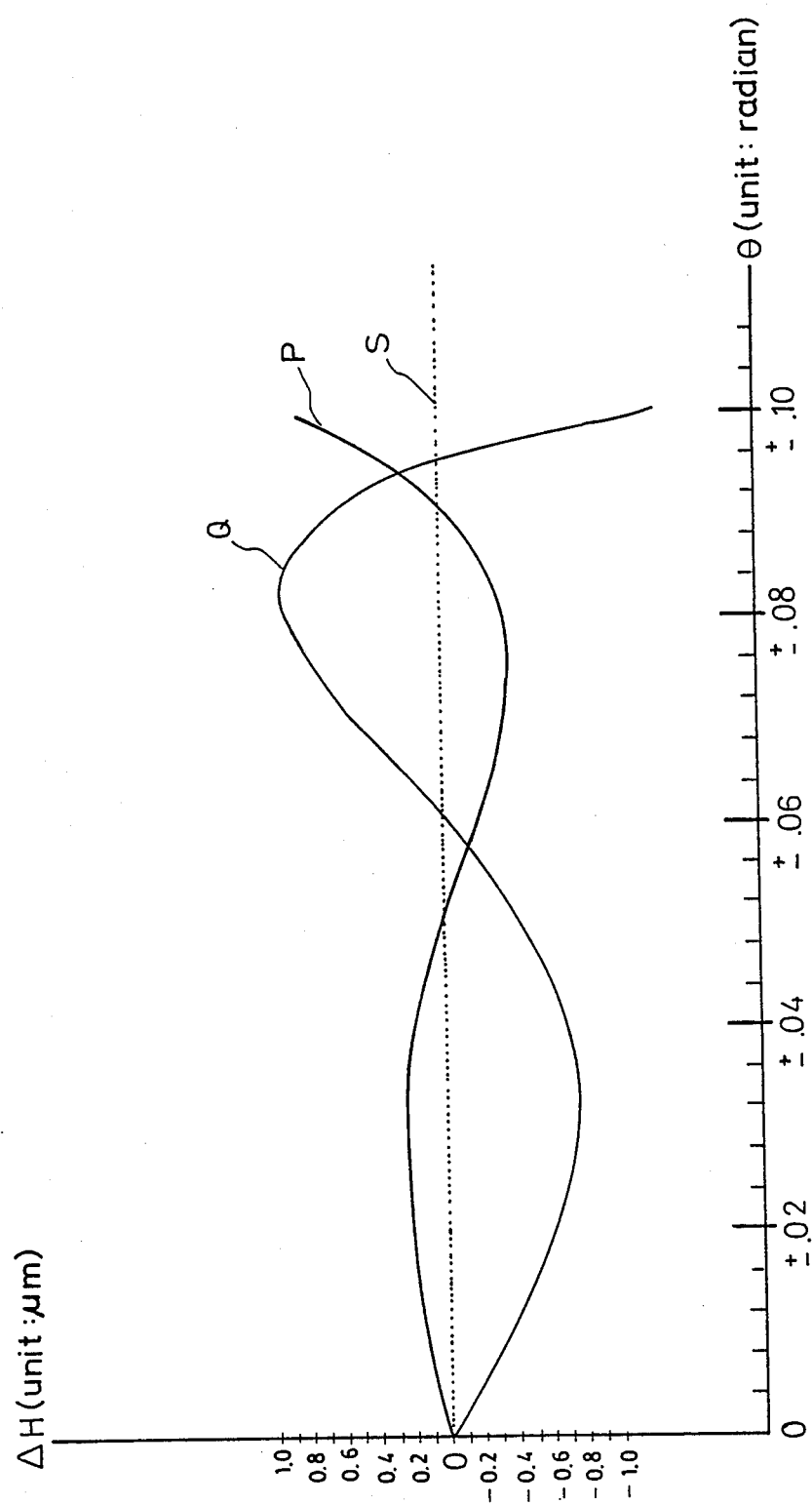
FIG. 3 is a diagram compare the linearity between the lens of the present invention and the conventional lens.

FIG. 3 is a linearity comparison diagram between the lens of the present invention and that of U.S. Pat. No. 3,973,833 within a given operation scope; that is in real use, incident angles within the range of about 5.5° above or under the axis of the lens, i.e., being within 0.1 radian. According to the data of the embodiment of the present invention, there is a deviation value $\Delta H$ between the actual heights of the output beams generated at a different angle of incidence within a given operation scope and the theoretical heights as expected according to the incident angle; the deviation value $\Delta H$ is calculated with computer. The smaller the maximum deviation within the operation scope is, the higher the linearity will be, i.e., having better precision. In FIG. 3, the horizontal axis indicates the incident angles of the beams projected through the lens, i.e., from zero to 0.1 radians ±; 0.004 radians is used as a drawing unit; the dual value symbol "±" denotes that the height of the transmitted beams are symmetrical relative to the axis of the lens (where $\theta=0$). The vertical axis indicates the theoretical height, in which the horizontal dotted line S is used as the reference level for drawing the deviation values $\Delta H$ of the actual heights at various angles of incidence $\theta$; in the curves, P denotes the curve generated by the lens of the present invention, while Q denotes the curve generated by the conventional lens. The deviation value $\Delta H$ is indicated with μm. FIG. 3 shows the operation scope is within 0.09 radians. The maximum deviation value on curve P of the present invention is about 0.37 μm, while the maximum deviation value on curve Q of the conventional lens is about 0.87 μm; in other words, the linearity of the present invention is higher than that of the conventional lens, i.e., the deviation value of the lens of the present invention is equal to about one third of that of the lens in the patent reference cited of the manufacturing tolerance is not concerned; it means that, under the same linear deviation condition, the present invention would have a wider manufacturing tolerance to facilitate manufacturing and assembling work; therefore, the present invention is deemed a novel and practical disclosure.

We claim:

1. A lens for a scanning device and being adaptable to a scanning device having a light source at a wavelength of substantially 0.6328 μm said lens comprising three elements which having their radii of curvature of $R_1$, $R_2$, $R_3$, $R_4$, $R_5$ and $R_6$ along the direction of the light beam said lens including, in order, a bi-convex lens as the first element, a concave-convex lens as the second element, and a bi-convex lens as the third element being mounted on a common axis; and said three elements having their thickness of $T_1$, $T_2$, and $T_3$ respectively; and a space D being set between said first and said second elements, while said second and said third elements being mounted closely so as to have said lens had an equivalent focal length F in the following conditions:

$1.8F \leq R_1 \leq 2.2F$; $0.47F \leq |R_2| \leq 0.57F$;
$0.43F \leq |R_3| \leq 0.53F$; $0.8F \leq |R_4| \leq 1.2F$;
$4F \leq R_5 \leq 5F$; $3F \leq |R_6| \leq 4F$;
$T_1 \approx 0.06F$; $T_2 \approx 0.03F$;
$T_3 \approx 0.06F$; $D \approx 0.02F$ The aforesaid conditions are based on the refractive indexes of the elements ranging from 1.5 to 1.8, Whereby, an incident beam projects into the lens from the front focus of the lens at an incident angle $\theta$ will form a transmitted beam parallel with the axis of the lens; the height H above the axis of the lens follows the function $H=KF\theta$, in which K is a constant.

2. A lens as claimed in claim 1, upon the refractive indexes of the three elements (from the first to the third one) set on 1.644, 1.756 and 1.515, the best data of the lens are:

$R_1=2.04624F$
$|R_2|=0.51675F$, $|R_3|=0.480054F$,
$|R_4|=1.012065F$, $R_5=4.43941F$,
$|R_6|=3.61058F$, $T_1=0.05944F$,
$T_2=0.02702F$, $T_3=0.05789F$,
and $D=0.02053$.

* * * * *